United States Patent
Hämynen

(10) Patent No.: US 7,305,435 B2
(45) Date of Patent: Dec. 4, 2007

(54) INTERNET ACCESS VIA SMARTPHONE CAMERA

(75) Inventor: Kimmo Hämynen, Espoo (FI)

(73) Assignee: Nokia Corporation, Espoo (FI)

( * ) Notice: Subject to any disclaimer, the term of this patent is extended or adjusted under 35 U.S.C. 154(b) by 6 days.

(21) Appl. No.: 10/648,771

(22) Filed: Aug. 25, 2003

(65) Prior Publication Data

US 2005/0050165 A1    Mar. 3, 2005

(51) Int. Cl.
    *G06F 15/16* (2006.01)

(52) U.S. Cl. .............. 709/203; 709/217; 709/219; 709/245; 709/247; 341/13; 382/176; 382/177; 382/179; 382/182; 382/187; 382/229; 382/313; 382/321

(58) Field of Classification Search ......... 709/201, 709/217, 245, 202, 247, 203, 219; 341/13; 382/182, 187, 229, 313, 321, 176, 177, 179
    See application file for complete search history.

(56) References Cited

U.S. PATENT DOCUMENTS

| | | | |
|---|---|---|---|
| 6,311,214 B1 * | 10/2001 | Rhoads ................. | 709/217 |
| 6,330,976 B1 * | 12/2001 | Dymetman et al. ....... | 235/487 |
| 6,389,182 B1 * | 5/2002 | Ihara et al. ............ | 382/309 |
| 6,396,598 B1 * | 5/2002 | Kashiwagi et al. ....... | 358/474 |
| 6,505,776 B1 | 1/2003 | Wilz, Sr. et al. ....... | 235/462.01 |
| 6,522,889 B1 | 2/2003 | Aarnio | |
| 6,560,640 B2 * | 5/2003 | Smethers ............... | 709/219 |
| 6,778,988 B2 * | 8/2004 | Bengtson .............. | 707/10 |
| 6,917,724 B2 * | 7/2005 | Seder et al. ............ | 382/321 |
| 7,188,307 B2 * | 3/2007 | Ohsawa ................. | 715/513 |
| 2002/0016816 A1 * | 2/2002 | Rhoads ................. | 709/203 |
| 2002/0032734 A1 * | 3/2002 | Rhoads ................. | 709/204 |
| 2002/0156866 A1 * | 10/2002 | Schneider .............. | 709/218 |
| 2002/0169963 A1 * | 11/2002 | Seder et al. ............ | 713/176 |
| 2003/0044068 A1 * | 3/2003 | Kagehiro et al. ......... | 382/182 |
| 2003/0169924 A1 * | 9/2003 | Nishiyama et al. ....... | 382/182 |
| 2005/0044183 A1 * | 2/2005 | Meunier et al. ......... | 709/219 |
| 2006/0122983 A1 * | 6/2006 | King et al. ............. | 707/3 |
| 2006/0171588 A1 * | 8/2006 | Chellapilla et al. ...... | 382/185 |

OTHER PUBLICATIONS

Combining Statistical Measures to Find Image Text Regions, Clark, P.; Mirmehdi, M.; Pattern Recognition, 2000. Proceedings. 15th International Conference on, vol. 1 , Sep. 3-7, 2000 pp. 450-453, vol. 1.*

(Continued)

*Primary Examiner*—Michael Y. Won

(57) ABSTRACT

A mobile device, system, method, and software for communicating with the internet utilizing a written universal resource locator (URL). A camera unit is used to receive a raw visual light image containing a written URL, the raw visual light image is converted to an electronic image, and the device locates glyphs of at least one particular standardized set of URL characters in the electronic image, for example glyphs corresponding to www. Then the URL characters are extracted from the electronic image, the URL is sent in a request signal to a web server, and in response an internet site is presented. The mobile device includes initiation means for sending an instruction to obtain a raw visual light image that includes glyphs of at least one particular set of characters, such as www, and further includes a camera, a display, and an internet interface. The mobile device processes an electronic image signal provided by the camera, in order to obtain the web site signal from the internet interface.

24 Claims, 7 Drawing Sheets

OTHER PUBLICATIONS

"Combining Statistical Measures to Find Image Text Regions", P. Clark et al, Univ. of Bristol, Dept of Computer Science, Sep. 2000, pp. 450-453.

Fumitaka Abe, et al., *Mobile Image Scanner*, Sep. 1998, FUJITSU Sci. Tech. J., 34, 1,00.125-132.

Paul Clark and Majid Mirmehdi, *Locating Text in Indoor Scenes*, Jul. 17, 2003, Published on the internet, pp. 1-3.

* cited by examiner

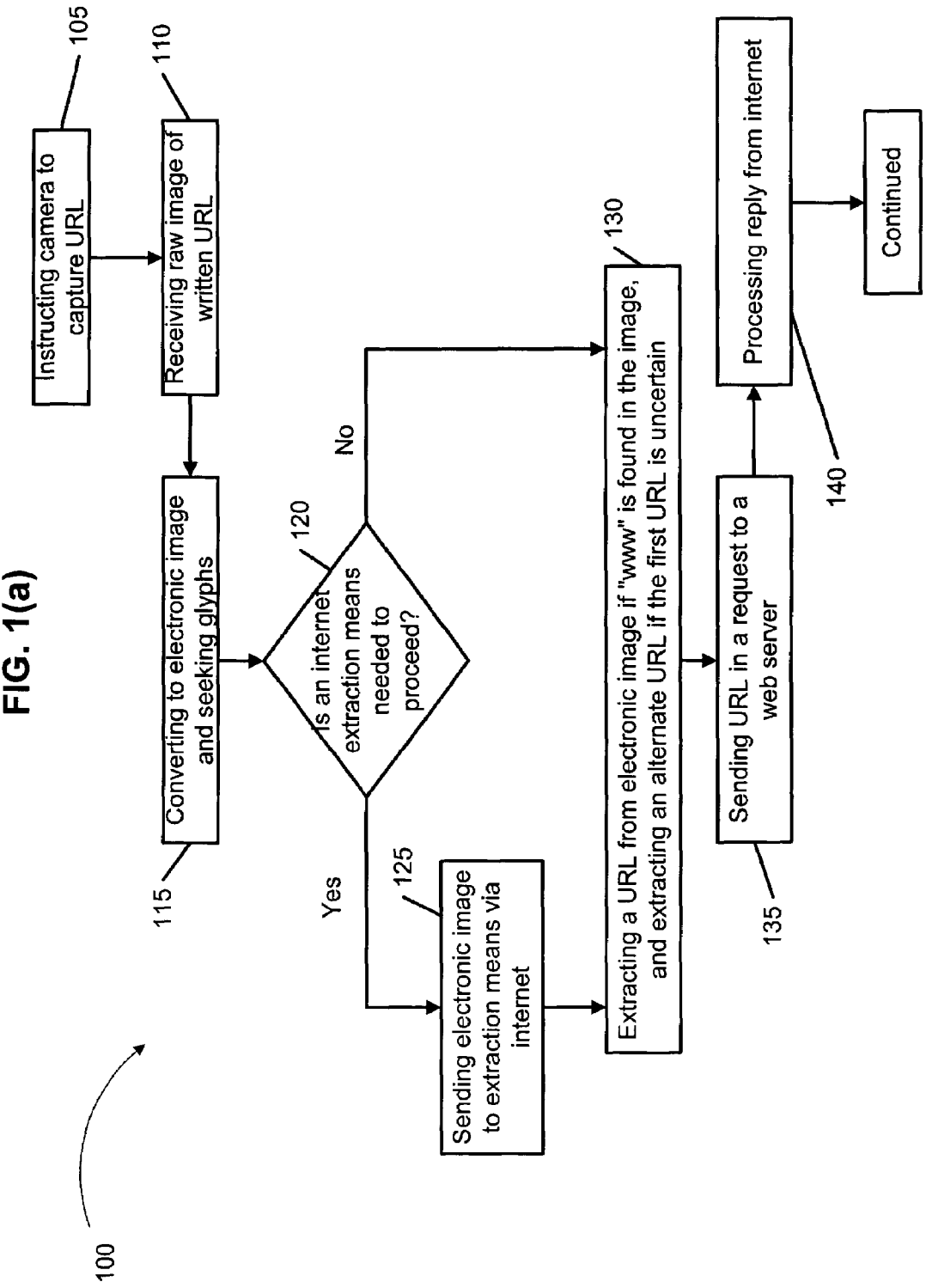

FIG. 6
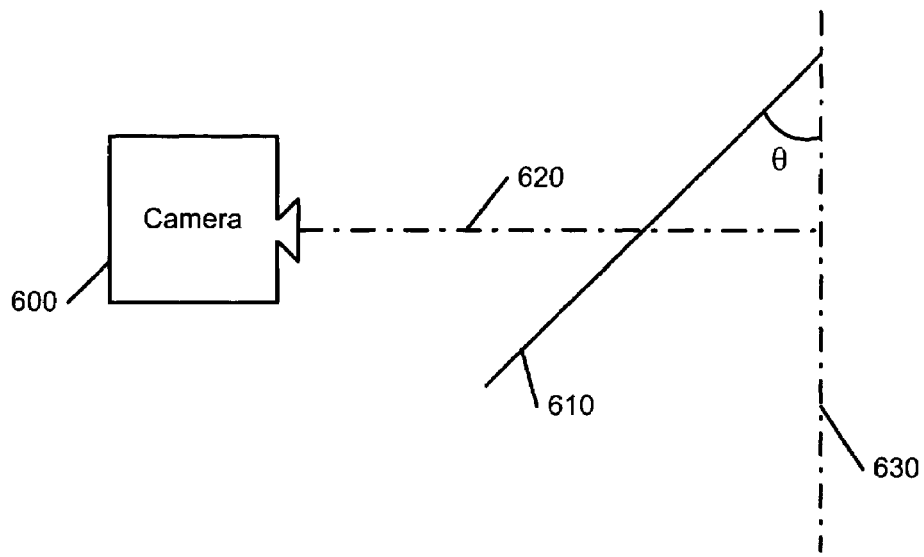
FIG. 7(a)      FIG. 7(b)      FIG. 7(c)
   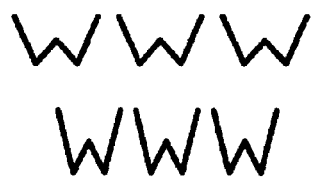   
$\theta = 0°$         $\theta = 22°$         $\theta = 45°$
FIG. 8(a)      FIG. 8(b)      FIG. 8(c)
$\theta = 0°$         $\theta = 22°$         $\theta = 45°$

INTERNET ACCESS VIA SMARTPHONE CAMERA

TECHNICAL FIELD OF THE INVENTION

Methods and devices for entering universal resource locators (URLs) in order to access internet web sites, and particularly automated entry of URLs in a wireless environment.

BACKGROUND ART

Wireless devices are increasingly capable of accessing the internet. When the user of a wireless device encounters a universal resource locator (URL), also known as a uniform resource locator, that is written on a billboard, or written on paper, or written in some other print or advertising context, the user typically must type the URL in his device in order to access the web site in question. This can be a tedious and time-consuming process. The user has to type in the addresses manually, and sometimes long addresses cause annoyance.

A user of a wireless device may be outdoors, perhaps at a bus stop, where there is an advertisement containing an interesting URL. In such an outdoor situation, it can be very awkward and distracting to use a keyboard to type the URL. Moreover, the user would be likely to make typing errors that can be frustrating, and may therefore access an incorrect web page such as a web page indicating that the requested server cannot be found.

These problems suggest that improved automated entry of URLs would be useful. Wireless methods and devices have already been invented that include a camera in the mobile device, the mobile device being wirelessly connected to a server. The server extracts text from an image captured by the camera. See Aarnio (U.S. Pat. No. 6,522,889). However, such inventions are directed at determining a user's geographic location, or at providing language translation, and are not well-adapted to reading or accessing internet addresses without extensive assistance from a server that must be accessed via the wireless network.

Technology has also been developed to allow the user of a mobile device to scan a barcode and thereby obtain automatic access to an internet site indicated by the barcode. However, that type of system has disadvantages too. For example, the bar code must be in close proximity to the scanner, and of course the barcode itself must be provided, instead of or in addition to a plain text URL. Even if an optical character reader is used instead of a bar code scanner, such a reader must still scan the URL text in close proximity to the text according to the existing technology, and the reader must be at a particular orientation with respect to the text, and furthermore the reader must be an automatic holographic laser scanner instead of a camera. See Wilz (U.S. Pat. No. 6,505,776, column 21). Other mobile image scanners could be used, but they present the same or similar problems. See FUJITSU Sci. Tech. J, 34, pp. 125-132 (September 1998).

Generally speaking, digital cameras that shoot arbitrary scenes and landscapes have been unsuitable for collecting character information from documents or signs or the like. Infrared digital cameras have been employed for character collection in smart pens, for example in the Ericsson Chat-Pen which shines infrared light on dots created by the ChatPen itself, but cameras have not been used in more general contexts, where sophisticated scanners such as laser scanners have been needed.

Text can be acquired from images by the well known process of optical character recognition (OCR). Yet, a major limitation of OCR software is that a directly frontal image of the document has normally been required. The automatic recognition of text in arbitrary scenes, where the text may or may not be perpendicular to the line of sight, is a developing science that needs to be more fully exploited and tailored to recognize particular character strings. See "Locating Text in Indoor Scenes," by Mirmehdi and Clark (available at www.cs.bris.ac.uk/Research/Digitalmedia/docum.html).

OCR generates character codes to match the pictured text. If OCR works perfectly, the character codes exactly match the text that has been scanned or photographed. However, scanning is part science and part art. Errors are inevitable, and therefore a good OCR system for acquiring internet URLs is needed for coping not just with situations where the OCR works perfectly, but also for situations where OCR does not initially work perfectly.

Optical Character Recognition (OCR) works by analyzing glyphs (a glyph is the visual image of a character) in order to yield character codes for alphanumeric or punctuation characters. Glyphs (images) and characters (symbols) are two linked but distinct concepts. The unique visual aspects of URL glyphs have yet to be fully exploited, in the context of character recognition in a wireless environment.

DISCLOSURE OF THE INVENTION

The idea of the present invention is to use the special characteristics of URL glyphs to allow the camera of a mobile device to easily recognize URL glyphs at a distance, and automatically access or bookmark such a URL. The present invention combines existing technology that has already been used in scanners and smart pens and the like, with new URL-recognition technology, to "read" URL text without too much time or trouble.

In the user's browser application, there a menu bar can provide the user with an option such as "go to internet via camera" or "add bookmark via camera." The user selects this option to start the whole process, a camera that is included in the mobile device fetches a URL address that is written on a document, a sign, or some other flat surface.

A key ingredient in the present invention is the fact that virtually all advertised URLs and most URLs appearing in print include certain letters in either upper or lower case, such as the letter "www" or common domain extensions such as "com" or "net" or "gov" or "org" or "html" or various two-letter country abbreviations. This fact can be used to greatly simplify the OCR process, including in situations where the written URL is not perpendicular to the camera user's line of sight.

Common URL character strings are used as red flags to provide the mobile device information as to a URLs location within an electronic image, and to indicate the orientation of the URL text relative to the line of sight. This allows the OCR process to quickly compensate for lack of perpendicular text, to reorient the URL image, and to then read the rest of the URL quickly and without unnecessary support from a large computer located elsewhere in the wireless or internet network.

Optical character recognition of a URL is facilitated by knowing these characteristics of URL structure. For example, if OCR has already located a URL in an image by detecting "www," and then OCR detects "cem" at the end of the URL or "httb" at the beginning of the URL, then the OCR software will know to correct the URL text so that it says "com" at the end or "http" at the beginning, respectively. This is one of several ways that the present invention facilitates OCR error detection.

These features of URL structure allow a mobile device to be equipped with a camera that easily acquires a URL even if the URL is written on a flat surface far from the user, and the flat surface need not be perpendicular to the camera user's line of sight. After using the camera to acquire a raw image, the browser of the mobile device will contact a server and check if the recognized URL is valid. In case of an invalid URL, the application tries to make a new guess as to the correct URL. When the application arrives at a valid address, the browser is able to open the page for the user, or bookmark the page. However, in case the application is unable to arrive at a valid URL automatically, then the invalid URL can be edited by the user, e.g. by correcting a few obviously misspelled characters. For example, the misspelled URL might be www.VisitHourLocalLibrary.com and the user would be able to correct it by simply changing "H" to "Y." The user is also in a position to help the OCR system by zooming the picture, and/or by selecting (with a stylus or other means) the area of the image in which to search for the URL.

Another implementation of the present invention is to send the electronic "image" to a predefined URL, where URL recognition capacity would be located, instead of that capacity being entirely located within the mobile device. The service at the predefined URL would then return the valid potential URL address or addresses to the mobile device. The present invention is suitable for a software application, which includes a URL locator software module, a scan and text recognition software module, and a browser user interface module.

The ease of character recognition is a challenge. This process will become easier with further research that reduces the required computer capacity. However, text recognition from an image is already very well known technology that is modified and customized according to the present invention in a way that will be understood to those skilled in the art. Included in this invention is the ability of a mobile device to see a URL, zoom the camera to the URL, and open the page or bookmark it. The page will not be limited to hypertext markup language (HTML), and may instead be in another internet language such as extensible markup language (XML), or extensible HTML (XHTML) which is an XML application designed to replace HTML.

According to the method of the present invention, a web site is accessed in response to a universal resource locator (URL). The method involves using a camera unit to receive a raw image that contains a written URL, converting the raw image to an electronic image, searching for glyphs of at least one particular set of characters in the electronic image, extracting an extractable URL from the electronic image, sending the extractable URL in a request signal to a web server, processing a reply from the web server, and then displaying an internet site acoustically or visually.

The system of the present invention, for accessing a web site in response to a URL, includes a camera, responsive to a raw image containing the written URL. The camera is for providing an electronic image signal indicative of the raw image. The system also includes URL extraction means, responsive to the electronic image signal from the camera, for finding glyphs of at least one particular set of characters in the electronic image, and for providing a URL request signal indicative of an extractable URL. The system furthermore includes an internet interface, responsive to the URL request signal from the URL extraction means, for providing a web site signal indicative of an internet site accessed via the internet. A display is responsive to the web site signal, and is for visually or acoustically displaying the internet site.

The mobile device of the present invention is for accessing a web site in response to URL, and the mobile device includes initiation means for sending an instruction to obtain a raw image containing glyphs of at least one particular set of characters. The mobile device also includes a camera, responsive to the instruction from the initiation means, for receiving the raw image and for providing an electronic image signal indicative of the raw image. The mobile device's display is for displaying the web site acoustically or visually or both, and the display is responsive to a web site signal that indicates an internet site corresponding to an extractable URL that has been extracted from the raw image. The mobile device furthermore includes an internet interface, for providing the web site signal to the display after communicating with the internet. This mobile device is for processing the electronic image signal provided by the camera, in order to obtain the web site signal from the internet interface.

The computer-readable medium of the present invention is for use with a mobile device, and is encoded with a data structure that includes a URL locator software module for recognizing a location of URL glyphs in an electronic image. The data structure also includes a scan and text recognition software module for extracting an extractable URL from the electronic image. The data structure further includes a browser-based user interface module, for allowing the user to decide whether to send the extractable URL to the internet in order to immediately access a web site, or alternatively bookmark the extractable URL.

BRIEF DESCRIPTION OF THE DRAWINGS

FIG. 1(a) shows a flow chart describing a preferred embodiment of the present method.

FIG. 6 shows a camera acquiring an image from a flat surface that is not perpendicular to the camera's line of sight.

FIG. 7(a)-FIG. 7(c) shows glyphs of a particular set of characters, as viewed at various angles.

FIG. 8(a)-FIG. 8(c) shows glyphs of another particular set of characters, as viewed at various angles.

BEST MODE FOR CARRYING OUT THE INVENTION

A smart phone is a telephone with intelligence like that of a personal computer, including a display screen. These mobile devices can include a digital camera, for taking still photographs or filming videos. The camera may be physically connected to the rest of the smart phone, or it may be connected over a short distance from the rest of the phone by a wireless Bluetooth connection. In any event, such a smart phone can be wirelessly connected to the internet, and the present invention enhances this capability. In particular, it makes it easier for a user to access a URL that is seen by the camera, without the user having to type in the URL.

According to a preferred embodiment of this invention, the camera receives a raw image that is taken substantially instantaneously, as a still photograph, and this single raw image contains the entire URL. Thus, there is no need for a series of photos, nor is there any need to shine anything on the URL such as laser light or infrared light, except that a flash bulb could be used as for any other photograph when the subject of the photograph would otherwise be dimly lit.

The mobile device is able to quickly detect and extract the URL, by making use of the particular patterns and features unique to URLs. This process of character recognition uses, for example, the fact that many URLs include the letters www, and this fact facilitates the character recognition even if the URL is written on a flat surface that is not perpendicular to a line of sight with the user.

Figure 1B:
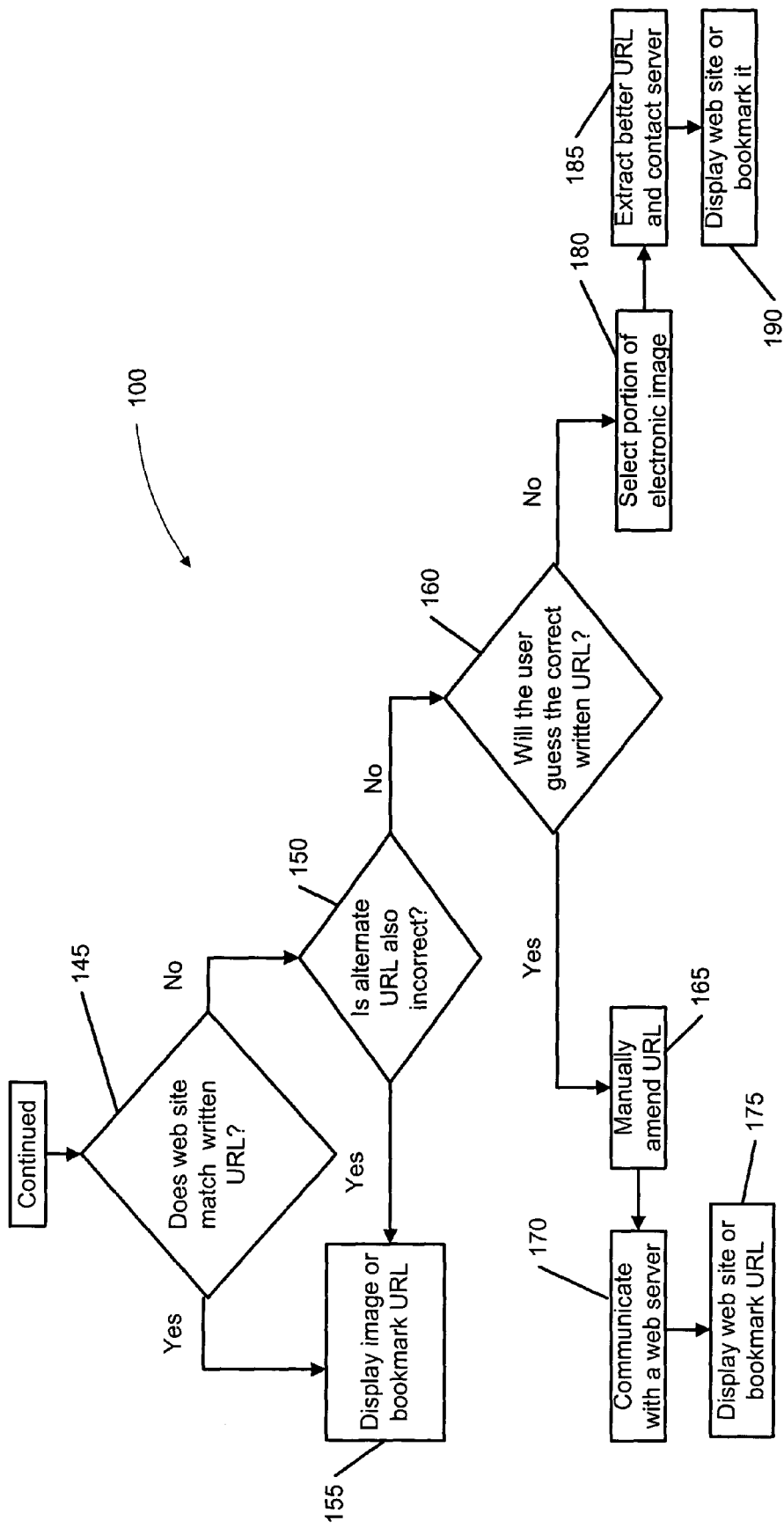
FIG. 1(b) is a continuation of FIG. 1(a).

Referring to FIG. 1(a), a preferred embodiment of the present invention is shown by way of a flow chart 100 that is continued in FIG. 1(b). The first step is to instruct 105 the camera to capture a URL. This instruction can include further detail, such as whether to got to the internet via the URL, or alternatively bookmark the URL, and these options can be selected from a browser menu on the user's display screen, or they can be activated by voice (for example by saying "camera go to internet" or "camera bookmark"), or they can be activated by designated buttons on the camera or on the rest of the mobile device. The camera will then receive 110 the raw image containing the written URL, and will convert 115 the raw image to an electronic image in which glyphs are sought. The mobile device will begin by seeking a very common set of URL glyphs, such as an image of "www." If the mobile device cannot find this basic set of glyphs, then, depending upon the capacities of the mobile phone, it can proceed 120 by attempting to extract the URL (e.g. by looking for other basic sets of glyphs such as http, gov, org, net, com, et cetera), or can proceed by sending 125 the electronic image via internet to an extraction means having greater ability to recognize characters. Either way, an extractable URL will be extracted 130 from the electronic image, and one or more additional alternative URLs can also be extracted if there is uncertainty about what the actual written URL says.

The extractable URL is then sent 135 in a request to a web server via the internet, in order to access the web site identified by the extractable URL. A reply from the web server is then processed 140. The mobile device then checks 145 whether the reply from the web server indicates an invalid URL and/or asks the user whether an incorrect web page is being displayed, in which case the actual written URL that was photographed most likely does not match the web site accessed by the mobile device. If there is a mismatch, then the mobile device will try accessing the internet using the one or more additional alternative URLs mentioned previously, and will again check 150 whether the results are okay. If a correct URL is obtained, then the corresponding web site will be displayed or bookmarked 155.

However, if the correct URL has not been obtained, then the user can decide 160 if he wants to edit an incorrect URL. If so, then the user manually amends 165 the URL displayed by the mobile device, at which point the mobile device communicates 170 with a web server, and displays or bookmarks 175 a correct web site. If the user does not want to guess how to edit the incorrect URL, the user can instead view the electronic image and select 180 the portion of the image where the URL is located, for instance by using a zoom function, or by using a stylus. Then the mobile device can again try to extract 185 a better URL and request that URL from a server. And, the proper web site corresponding to the photographed URL will then be displayed or bookmarked 190.

Figure 2:
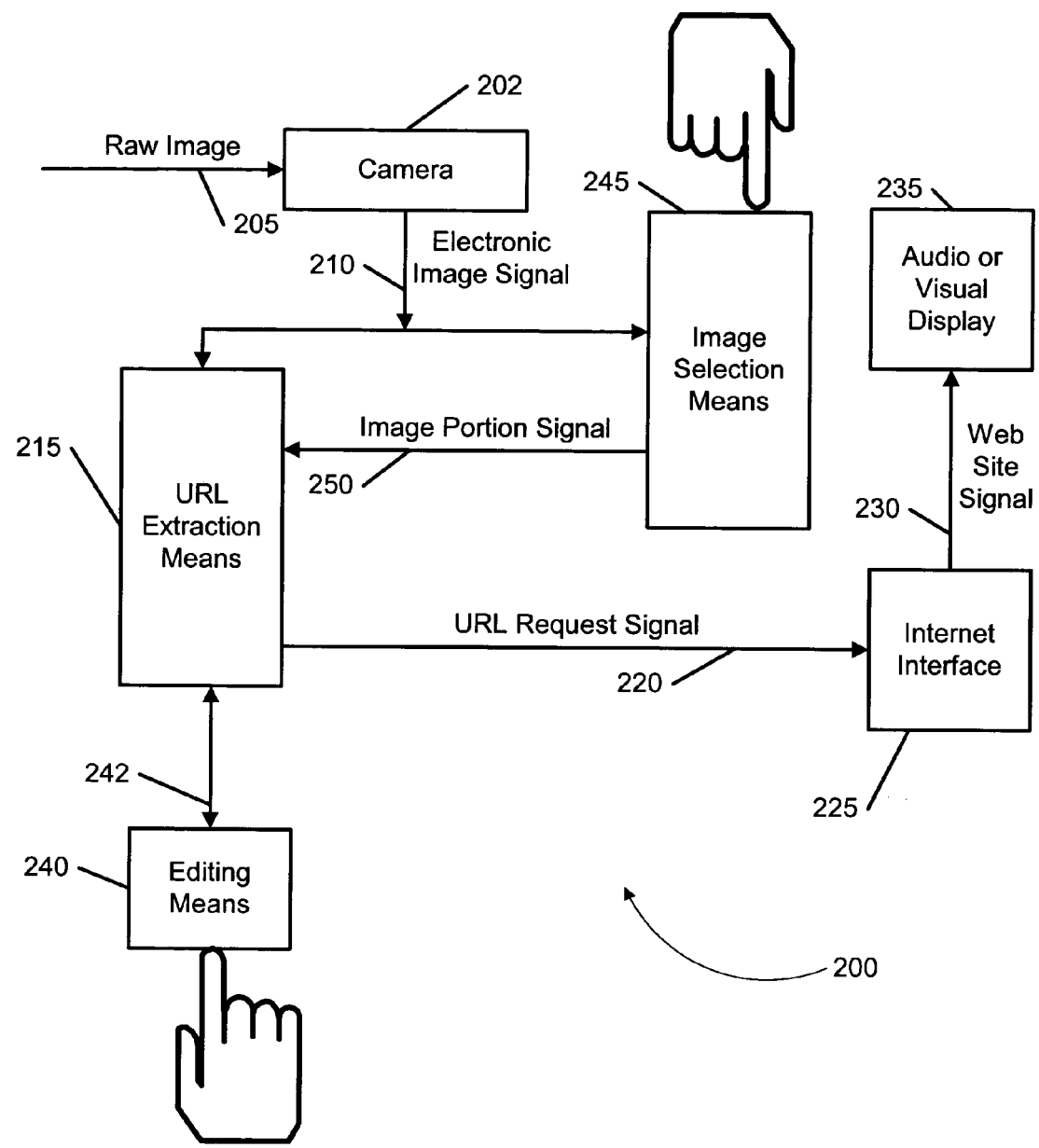
FIG. 2 describes a system according to a preferred embodiment of the present invention.

Referring now to FIG. 2, that figure shows a system 200 according to a best mode embodiment of the present invention. The system includes the camera 202 which is responsive to the raw image 205 containing the written URL, and the camera is for providing the electronic image signal 210 indicative of the raw image;

The system further includes URL extraction means 215, responsive to the electronic image signal 210, for finding glyphs of at least one particular set of characters in the electronic image, and for providing a URL request signal 220 indicative of an extractable URL to the internet interface 225. The internet interface 225 is responsive to the URL request signal 220, and is for providing a web site signal 230 indicative of an internet site accessed via the internet. The system also includes a display 235, responsive to the web site signal 230, for visually or acoustically displaying the internet site. In other words, the display can show a visual image or also play sound associated with the internet site.

All parts of this system are, in a preferred embodiment, situated within a mobile device, or alternatively the URL extraction means 215 is partly or entirely located elsewhere, for example at an internet server that is accessible to the mobile device via the internet. This system 200 further includes editing means 240 operatively connected 242 to the URL extraction means 215, for manually correcting or amending the URL extracted by the extraction means 215 if that URL is different from the written URL that was photographed (e.g. if an extracted URL was tried and resulted in an invalid message from the internet).

The system 200 further includes an image selection means 245 by which the user can indicate a portion of the electronic image where the written URL is depicted. This indication is provided in an image portion signal 250 to the URL extraction means 215.

Figure 3:
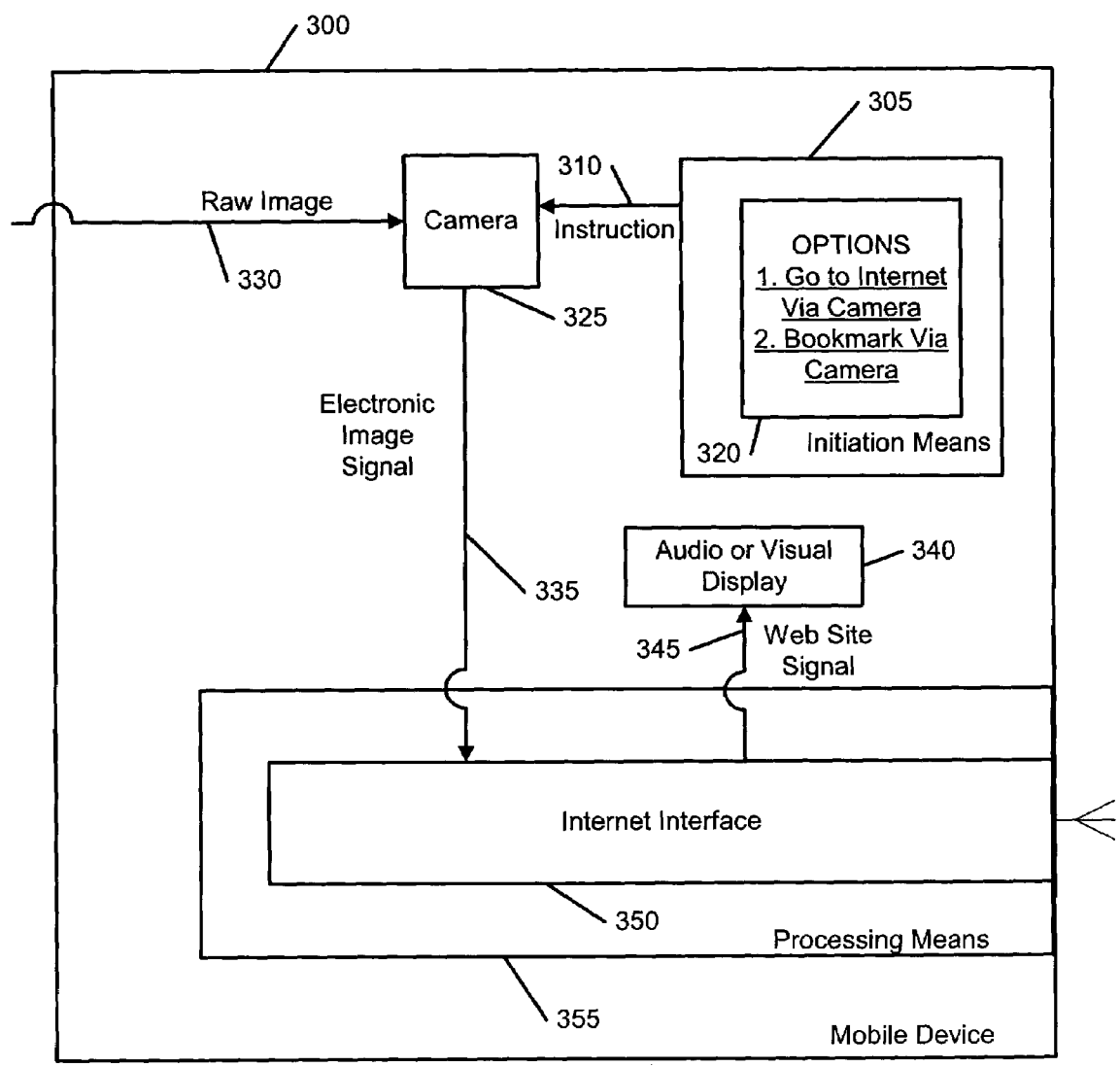
FIG. 3 describes a mobile device according to a preferred embodiment of the present invention.

Referring now to FIG. 3, this figure shows a mobile device 300 for accessing a web site in response to a universal resource locator (URL), according to a first preferred embodiment of the present invention. The mobile device 300 comprises initiation means 305 for sending an instruction 310 to obtain a raw image that includes glyphs of at least one particular set of characters (e.g. glyphs of "www"). The initiation means 315 can be realized by a menu of options 320, by which the user can instruct the mobile device to go to the internet via a camera image of a written URL, or alternatively the user can instruct the mobile device to instead bookmark a URL via a camera image of that URL.

The mobile device also includes a camera 325, responsive to the instruction 310 from the initiation means 305, and the camera is for receiving the raw image 330 and for providing an electronic image signal 335 indicative of the raw image. The mobile device 300 further includes a display 340 for displaying the web site acoustically or also visually, the display being responsive to a web site signal 345 indicative of an internet site corresponding to an extractable URL that has been extracted from the electronic image signal 335 that was itself extracted from the raw image 330. Additionally, the mobile device includes an internet interface 350, for providing the web site signal 345 to the display 340 after communicating with the internet. The mobile device 300 is for processing the electronic image signal provided by the camera 325, in order to obtain the web site signal 345 from the internet interface 350, and the internet interface 350 is part of that processing means 355.

Figure 4:
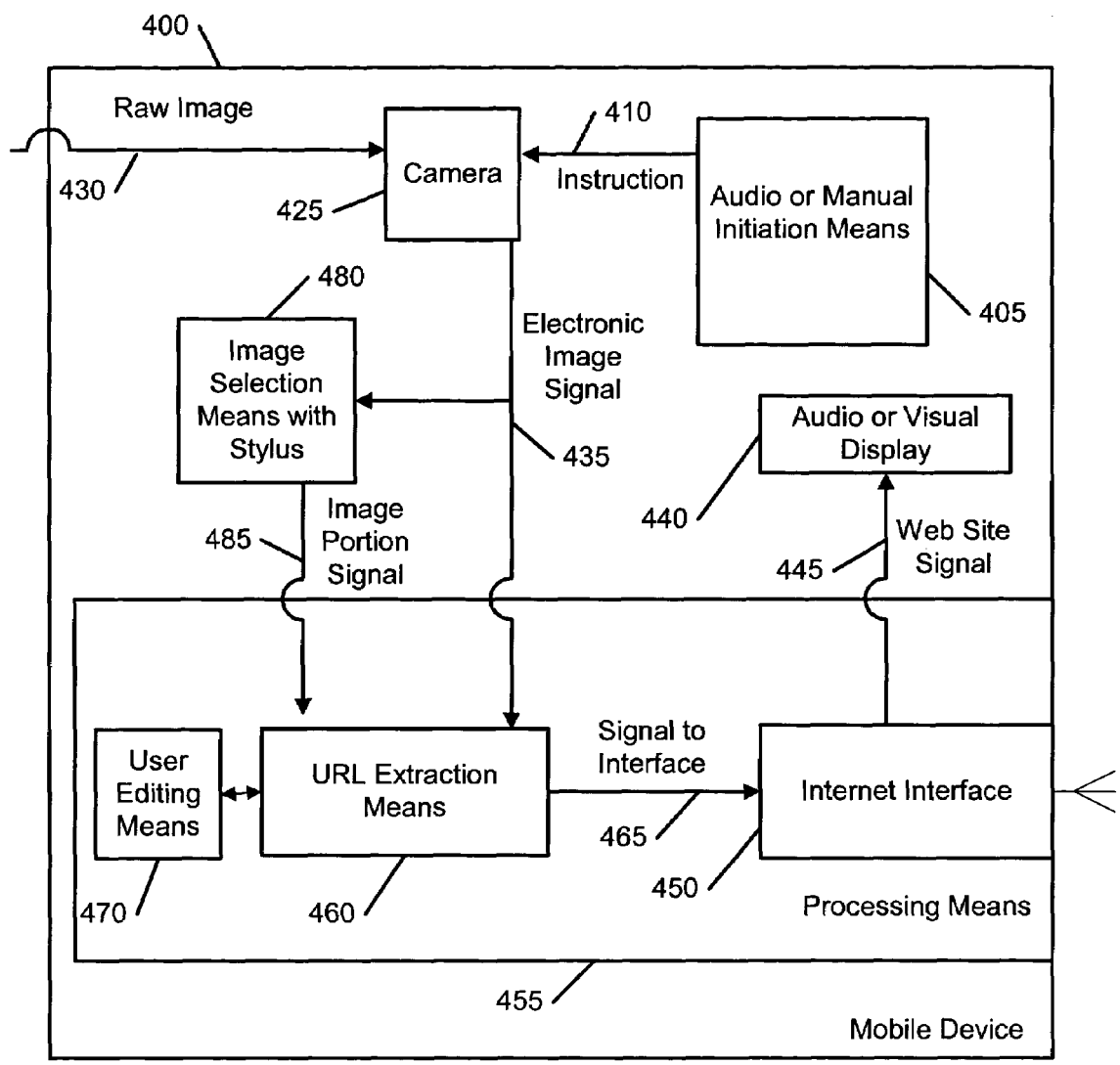
FIG. 4 describes another mobile device, according to a further preferred embodiment of the present invention.

The mobile device of FIG. 3 is similar to that of FIG. 4. The latter shows a mobile device 400 for accessing a web site in response to a universal resource locator (URL), according to another preferred embodiment of the present invention. The mobile device 400 includes initiation means 405 for sending an instruction 410 to obtain a raw image that includes glyphs of at least one particular set of characters (e.g. glyphs of "www").

The mobile device also includes a camera 425, responsive to the instruction 410 from the initiation means 405, and the camera is for receiving the raw image 430 and for providing an electronic image signal 435 indicative of the raw image. The mobile device 400 further includes a display 440 for displaying the web site acoustically or also visually, the display being responsive to a web site signal 445 indicative of an internet site corresponding to an extractable URL that has been extracted from the electronic image signal 435 that was itself extracted from the raw image 430. Additionally, the mobile device includes an internet interface 450, for providing the web site signal 445 to the display 440 after communicating with the internet. The mobile device 400 is for processing the electronic image signal provided by the camera 425, in order to obtain the web site signal 445 from the internet interface 450, and the internet interface 450 is part of that processing means 455.

The processing means 455 further includes a URL extraction means 460 that is responsive to the electronic image signal 435 provided by the camera 425, the URL extraction means 460 being for finding the at least one particular set of glyphs according to the instruction 410, and for processing the electronic image signal 460, and for providing a URL request signal 465 to the internet interface 450. Of course, the internet interface can be a transceiver for communicating with the internet, plus additional communication equipment such as a modem, and some of this internet interface equipment can obviously be used for communicating with other entities as well. The internet interface 450 is responsive to the URL request signal 465, and is for providing the web site signal 445 after communicating with the internet.

The mobile device 400 further includes editing means 470, for manually amending the extractable URL if the extractable URL is different from the written URL (e.g. if the extractable URL resulted in an invalid message from the internet). This editing means 470 is operatively connected 475 to the URL extraction means 460.

The mobile device 400 additionally includes an image selection means 480, responsive to user input and responsive to the electronic image signal 435, and this image selection means 480 is for providing an image portion signal 485 indicative of a portion of the electronic image where the written URL is depicted. The mobile device 400 is for processing the image portion signal 485 to obtain the web site signal 445 from the internet interface 450, but the image portion signal 485 and the image selection means 480 will normally be used only at the discretion of the user, for example if not using these items results in an invalid web site signal from the internet.

Figure 5:
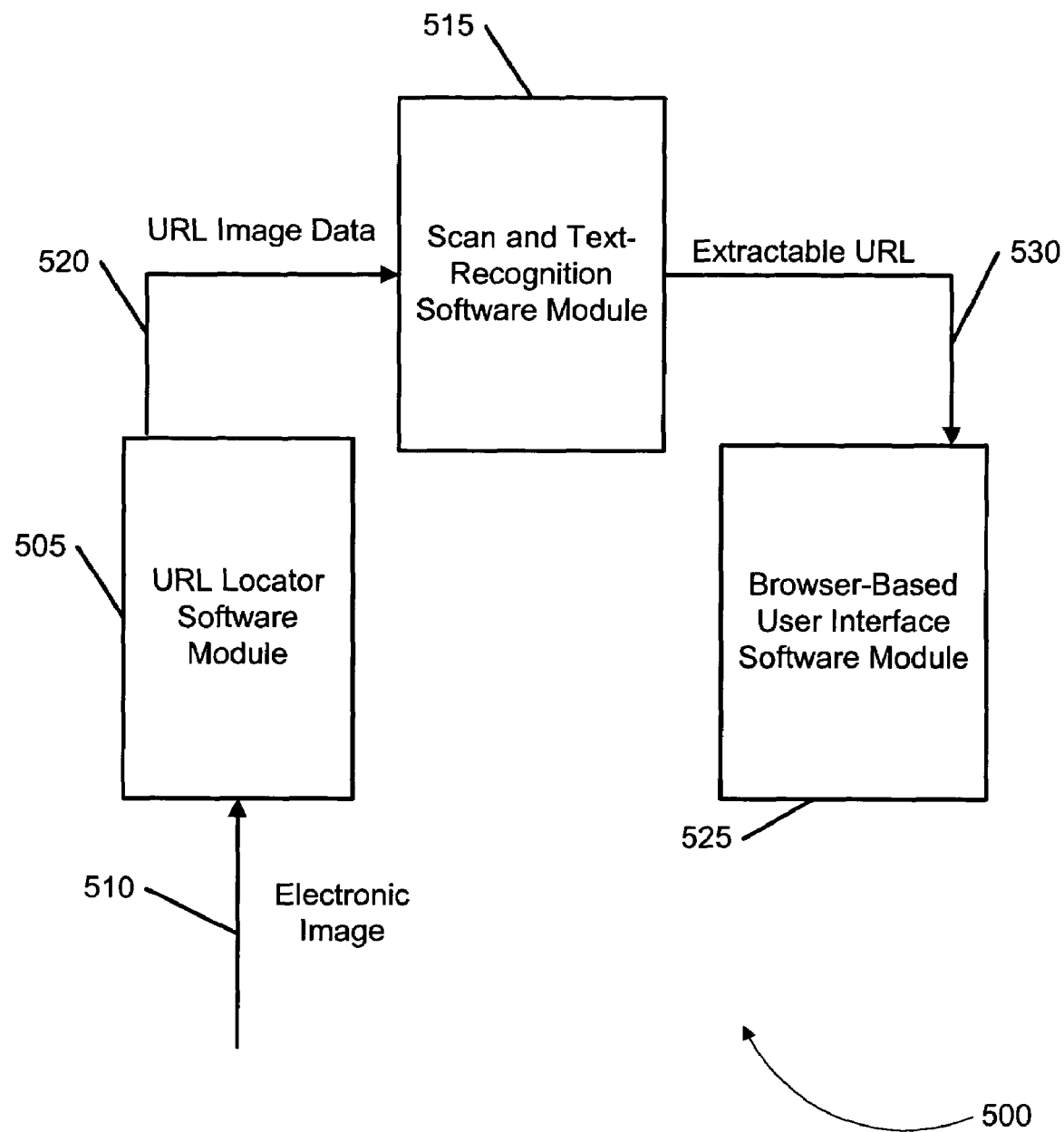
FIG. 5 shows a data structure of a computer-readable medium according to a preferred embodiment of the present invention.

Turning now to FIG. 5, that figure illustrates a computer-readable medium 500, for use with a mobile device, the computer-readable medium being encoded with a data structure comprising various software modules. A URL locator software module 505 is for recognizing a location of URL glyphs in an electronic image 510. A scan and text recognition software module 515 is for extracting an extractable URL based upon URL image data 520 provided by the URL locator software module 505. And, a browser-based user interface module 525 is for allowing the user to decide whether to send the extractable URL 530 to the internet in order to immediately access a web site, or alternatively bookmark the extractable URL.

FIG. 6 shows a typical URL acquisition scenario according to the present invention. The camera 600 of the mobile device will be acquiring a raw image of a written URL from a surface 610 that is not perpendicular to the line of sight 620. The plane 630 perpendicular to the line of sight 620 is at an angle theta from the surface 610 upon which the URL is written. The plane 630 is not necessarily vertical to the Earth's surface, and may horizontal to that surface, or at any other arbitrary angle with respect to the Earth's surface. FIG. 7 shows the kind of result that will occur when theta is non-zero: the glyphs "www" will be shortened or squeezed or both, and this shortening or squeezing will become more dramatic as theta increases. FIG. 8 shows the same sort of effect for the glyphs "com." Thus, the present method, system, and mobile device will search for the glyphs "www" or the glyphs "com" or some other particular set of glyphs typical of a URL. The glyph of the letter "o" in FIG. 8 provides a particularly straightforward way for the present invention to determine the value of theta; if theta is zero, then the eccentricity of this glyph will be zero, but otherwise theta will be a function of the eccentricity of the letter "o." Once the value of theta is found, the present invention can compensate for that value, and thus greatly simply, expedite, and improve character recognition of the rest of the URL.

It is to be understood that all of the present Figures, and the accompanying narrative discussions of the best mode embodiments, do not purport to be completely rigorous treatments of the invention under consideration. A person skilled in the art will understand that the steps, signals, and components of the present application represent general cause-and-effect relationships that do not exclude intermediate interactions of various types, and will further understand that the various steps and structures described in this application can be implemented by a variety of different combinations of hardware and software which need not be further detailed herein.

What is claimed is:

1. A method comprising:
   using a camera unit to acquire a raw visual light image that contains a written uniform resource locator;
   converting the raw visual light image to an electronic image;
   having a mobile device locate and recognize glyphs of at least one particular standardized set of uniform resource locator characters in the electronic image, using the said characters as a flag to provide a location of the rest of the uniform resource locator, wherein the glyphs include "http" or "www";
   approximating an angle between a plane of at least one of the glyphs and a plane perpendicular to a line of sight from the camera;
   compensating for said angle before attempting extraction of remaining parts of the uniform resource locator;
   attempting to extract remaining parts of the uniform resource locator from the electronic image after locating and recognizing the glyphs;
   sending the results of the extraction attempt in a request signal to a web server in order to access an internet site;
   processing a reply from the web server; and
   presenting the internet site.

2. The method of claim 1, wherein the camera is a video or still camera for capturing arbitrary scenes.

3. The method of claim 1, wherein the certain character is the letter "o".

4. The method of claim 1, wherein extracting the uniform resource locator is performed at least partly via a telecommunications network.

5. The method of claim 1, further comprising manually amending the results if the results are different from the written uniform resource locator.

6. The method of claim 1, further comprising:
selecting a portion of the electronic image containing the written uniform resource locator, if the results are different from the written uniform resource locator,
extracting a more accurate uniform resource locator from the portion of the electronic image,
sending the more accurate uniform resource locator to a corresponding web server,
processing a further reply from the corresponding web server,
displaying a desired web site accessed via the corresponding web server in response to the more accurate uniform resource locator.

7. The method of claim 1, further comprising performing the extracting, sending, and processing steps again, if the reply indicated an invalid uniform resource locator.

8. The method of claim 7, wherein the performing is performed by a different computer having a greater capacity.

9. The method of claim 1, wherein the attempt also yields at least one alternate uniform resource locator that will be tried if the extractable uniform resource locator turns out to be invalid.

10. The method of claim 6, wherein the step of selecting the portion of the electronic image is performed manually using a stylus.

11. A computer-readable storage medium or media, encoded with a data structure for performing the method of claim 1.

12. A system comprising:
a camera, responsive to a raw visual light image that contains a written uniform resource locator, the camera being configured to provide an electronic image signal indicative of the raw visual light image;
a uniform resource locator extraction device, responsive to the electronic image signal, the extraction device being configured to find and recognize glyphs of at least one particular standardized set of uniform resource locator characters in the electronic image using said characters as a flag to locate the rest of the uniform resource locator, said characters including "http" or "www";
wherein the uniform resource locator extraction device is also for using the glyph of a certain character to approximate an angle between a plane of said glyph of the certain character and a plane perpendicular to a line of sight from the camera, and compensating for said angle before attempting recognition of remaining parts of the extractable uniform resource locator;
wherein said extraction device is also configured to provide a uniform resource locator request signal indicative of results of attempting to extract remaining parts of the uniform resource locator that are extracted from the electronic image signal after finding and recognizing the glyphs;
wherein the system further comprises an internet interface, responsive to the uniform resource locator request signal, the internet interface being configured to provide a web site signal indicative of an internet site accessed via the internet; and
wherein the system further comprises a display, responsive to the web site signal, for presenting the internet site.

13. The system claim 12, further comprised of an editing tool, for manually amending the results if they are different from the written uniform resource locator.

14. A mobile device comprising:
an initiation device, configured to send an instruction to obtain a raw visual light image which includes glyphs of at least one standardized set of uniform resource locator characters, including "http" or "www," wherein the characters are used as a flag to provide a location of the rest of the uniform resource locator;
a camera, responsive to the instruction from the initiation device, the camera being configured to receive the raw visual light image and configured to provide an electronic image signal indicative of the raw visual light image;
a display, responsive to a web site signal indicative of an internet site accessed by attempting to extract a uniform resource locator from the raw visual light image, wherein the attempt occurs after the mobile device locates, recognizes and uses one of the glyphs for approximating an angle between a plane of said glyph and a plane perpendicular to a line of sight from the camera, and configured to compensate for said angle; and
an internet interface, configured to provide the web site signal to the display after communicating with the internet.

15. The mobile device of claim 14, wherein the camera is a video or still camera for capturing arbitrary scenes.

16. The mobile device of claim 14, wherein the one of the glyphs is the letter "o".

17. The mobile device of claim 14, further comprising a uniform resource locator extraction device that is responsive to the electronic image signal provided by the camera, the uniform resource locator extraction device being configured to find the glyphs, and configured to process the electronic image signal, and configured to provide a uniform resource locator request signal to the internet interface;
wherein the internet interface is responsive to the uniform resource locator request signal, and is configured to provide the web site signal after communicating with the internet.

18. The mobile device of claim 14, wherein the internet interface is responsive to the electronic image signal, and is configured to process the electronic image signal by conveying the electronic image signal to an internet extraction site.

19. The mobile device of claim 14, wherein the initiation device is configured to give the user an option to make a bookmark for the uniform resource locator, and wherein the mobile device is configured to obtain the web site signal when the bookmark is retrieved.

20. The mobile device of claim 14, further comprised of an editing means, for manually amending the results of attempting to extract the uniform resource locator if the results are different from the written uniform resource locator.

21. The mobile device of claim 14, further comprising an image selection device, responsive to user input and responsive to the electronic image signal, configured to provide an image portion signal indicative of a portion of the electronic image where the written uniform resource locator is depicted; and wherein the mobile device is configured to process the image portion signal to obtain the web site signal from the internet interface.

22. The mobile device of claim 21, wherein the image selection device includes a stylus for selecting the portion of the electronic image where the written uniform resource locator is depicted.

23. An apparatus comprising:

means for sending an instruction to obtain a raw visual light image which includes glyphs of at least one standardized set of uniform resource locator characters, including "http" or "www," wherein the characters are used as a flag to provide a location of the rest of the uniform resource locator;

means, responsive to the instruction for receiving the raw visual light image and for providing an electronic image signal indicative of the raw visual light image;

means for displaying, responsive to a web site signal indicative of an internet site accessed by attempting to extract a uniform resource locator from the raw visual light image, wherein the attempt occurs after the locating, recognizing, and using at least one of the glyphs to approximate an angle between a plane of said glyph and a plane perpendicular to a line of sight from the camera, and configured to compensate for said angle; and means for providing the web site signal to the means for displaying, after communicating with the internet.

24. A software product for use in a mobile terminal, the software product comprising a computer readable storage medium having executable codes embedded therein; the codes, when executed, being adapted to carry out the functions of:

using a camera unit to acquire a raw visual light image that contains a written uniform resource locator;

converting the raw visual light image to an electronic image;

having a mobile device locate and recognize glyphs of at least one particular standardized set of uniform resource locator characters in the electronic image, using the said characters as a flag to provide a location of the rest of the uniform resource locator, wherein the glyphs include "http" or "www";

approximating an angle between a plane of one of the glyphs and a plane perpendicular to a line of sight from the camera;

compensating for said angle before attempting extraction of remaining parts of the uniform resource locator;

attempting to extract remaining parts of the uniform resource locator from the electronic image after locating and recognizing the glyphs;

sending the results of the extraction attempt in a request signal to a web server in order to access an internet site, processing a reply from the web server; and presenting the internet site.

* * * * *

UNITED STATES PATENT AND TRADEMARK OFFICE
CERTIFICATE OF CORRECTION

PATENT NO. : 7,305,435 B2 Page 1 of 1
APPLICATION NO. : 10/648771
DATED : December 4, 2007
INVENTOR(S) : K. Hamynen It is certified that error appears in the above-identified patent and that said Letters Patent is hereby corrected as shown below:

At col. 10, line 4 (claim 13, line 1) please insert --of-- after "system".

Signed and Sealed this

Twenty-seventh Day of May, 2008

JON W. DUDAS
*Director of the United States Patent and Trademark Office*